United States Patent [19]

Tacklind et al.

[11] 4,240,085
[45] Dec. 16, 1980

[54] ELECTROGRAPHIC RECORDER

[75] Inventors: Thomas A. Tacklind, San Jose; Ian Turner, Sunnyvale, both of Calif.

[73] Assignee: Xerox Corporation, Stamford, Conn.

[21] Appl. No.: 79,677

[22] Filed: Sep. 28, 1979

[51] Int. Cl.³ .................... G01D 15/06; G03G 15/00
[52] U.S. Cl. .................................. 346/153; 355/3 R
[58] Field of Search ...................... 346/153, 165, 154; 355/3 R, 3 TR, 10

[56] References Cited

U.S. PATENT DOCUMENTS

| | | | |
|---|---|---|---|
| 2,826,168 | 3/1958 | Grant, Jr. | 346/153 |
| 3,644,930 | 2/1972 | Stange et al. | 346/153 |
| 3,725,950 | 4/1973 | Lamb | 346/154 |
| 4,042,939 | 8/1977 | Lloyd et al. | 346/153 |
| 4,093,368 | 6/1978 | Nishikawa | 355/3 R |

Primary Examiner—Daryl W. Cook
Attorney, Agent, or Firm—Serge Abend

[57] ABSTRACT

An electrographic recorder of modular construction within which are a liquid development system and various electrical elements. Electromechanical connections between the electrical components and a housed power supply are made via a power distribution card lying upon the floor of the machine. To prevent electrical faults caused by liquid developer contamination, compartments are formed within the machine housing for isolating all liquid developer storage and usage locations from the electrical components. The compartments are configured to allow cooling air to be drawn into and through the housing, within the electrical component zone.

18 Claims, 12 Drawing Figures

ELECTROGRAPHIC RECORDER

This invention relates to an electrographic recorder of modular construction wherein the placement of machine components and sub-assemblies within the recorder is provided to isolate electrical components from contact with liquid developer within the system.

Electrographic recorders of the type disclosed herein comprise a web of recording material housed within the machine and driven past a row of charging electrodes for depositing charges on the material at selected areas. The charge patterns are made visible at a developing station where liquid developer is moved into contact with the recording material for a sufficient time to allow charged pigmented particles, held in suspension in a liquid solvent, to be attracted to the charged areas and to become attached to the recording material. The thus marked material is then passed out of the machine.

It is desired to provide a low cost, simple to assemble and adjust, compact and reliable machine. Difficulties arise in a system wherein liquid developer must be moved through the machine in close proximity to printed circuit boards and various other electrical components. Jarring of the machine or conduit leaks could cause short circuits.

In an attempt to lower costs and simplify construction of known electrographic recorders various techniques have been utilized in the art. For example, in U.S. Pat No. 3,725,950 there is disclosed a machine of the instant type wherein it is a stated object to minimize the number of components required, by making one component perform several functions. Also, it is stated in that patent that costs would be further reduced by minimizing the size of the over-all machine. To that end, components are arranged around the paper storage compartment. However, these cost saving techniques do not have a direct beneficial effect on service costs. No attempt has been made to prevent short circuits caused by contamination of electrical elements by the liquid developer.

The present invention relates to an electrographic recorder comprising a housing within which are positioned for optimum space utilization, in operative relationship, a support chassis for storing a supply of recording material, various electrical components, electromechanically connected to a power distribution card lying upon the floor of the housing, and liquid developer storage and usage components. Compartments or zones are provided within the housing for isolating all liquid containing elements from the electrical components to prevent electrical faults due to liquid developer contamination. Further, the electrical component zone is configured so that the components may be cooled by air being drawn into and through the housing therepast.

BRIEF DESCRIPTION OF THE DRAWINGS

This invention may be carried out, in one form, in accordance with the following detailed description and with reference to the drawings, in which.

Figure 1:
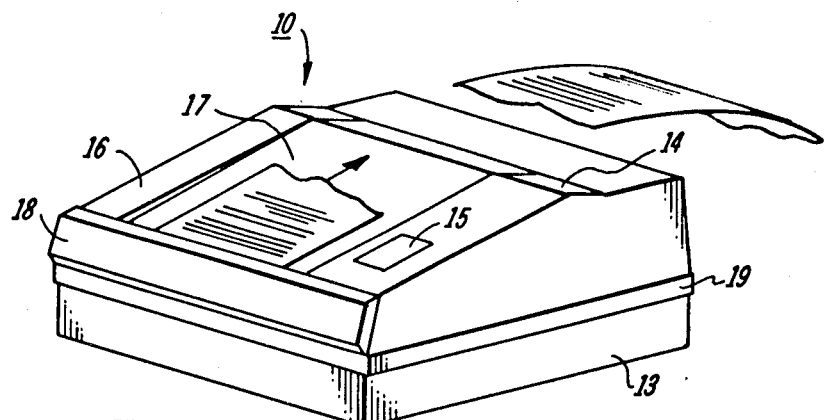
FIG. 1 is a perspective view of the improved electrographic recorder of this invention.
Figure 2:
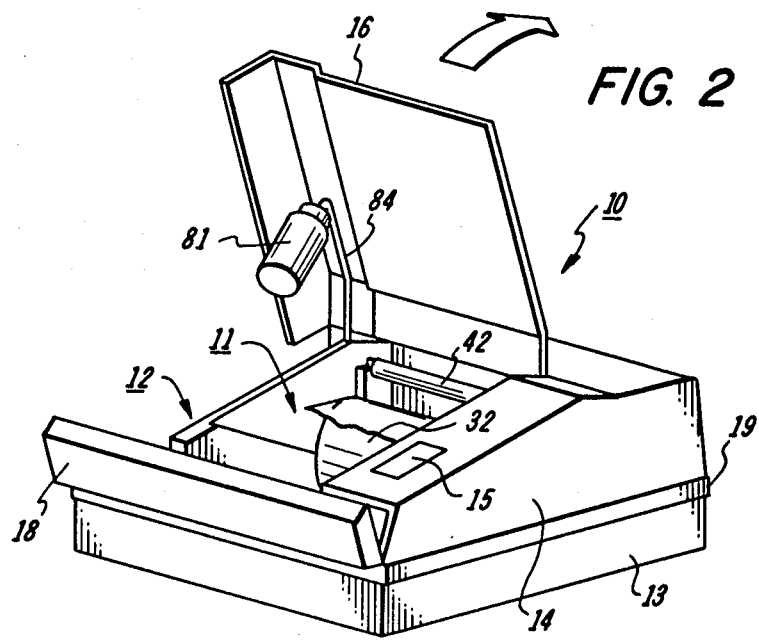
FIG. 2 is a perspective view of the electrographic recorder with its lid in the open position.

With particular reference to the drawing there is illustrated in FIG. 1 and FIG. 2 the overall configuration of an improved electrographic recorder 10. As will be readily observed the device has been designed to be compact and of low cost. To this end, the number and complexity of parts has been kept to a minimum and the overall manufacturability has been greatly simplified. This has been accomplished in part, by a modular construction. In addition, the recorder 10 has been engineered in such a way as to allow the user to have easy access to the paper storage zone 11 and liquid developer zone 12 so that paper and liquid developer replacement may be accomplished with minimum effort and maximum cleanliness.

The electrographic recorder 10 includes a molded plastic housing comprising a one piece base 13 having secured to it an L-shaped cover 14 with a side portion through which a control panel 15 protrudes. The cover is fixed in place during normal usage of the device. A hinged lid 16 may be swung open as shown in FIG. 2 to provide user access to the interior paper storage zone 11 and liquid developer zone 12. It may be securely maintained in its open position by means of a toggle arm (not shown), connected between the base and the lid. To provide a smooth surface over which the recorded paper may move on exiting the machine, a metal platen 17, preferably of smooth stainless steel, may be attached to the upper portion of the hinged lid 16 overlying the paper storage zone 12. The metal platen 17 shall be electrically grounded so as to insure that the paper does not bear a static electrical charge. To complete the housing, there is provided a latching front cover 18 pivotally hinged as shown in FIG. 2 to allow access to the paper drive arrangement. The exposed top edge of cover 18 may be formed with a sharp corner to provide a cutting edge for tearing the recording sheet.

As can be readily seen, the recorder 10 has been designed with a low profile. Thus, it may be seated upon a table top or, if desired, its profile may be further lowered by recessing it within a table opening. To this end, a circumferential lip 19 extends around the base 13 to provide a support surface.

Figure 3:
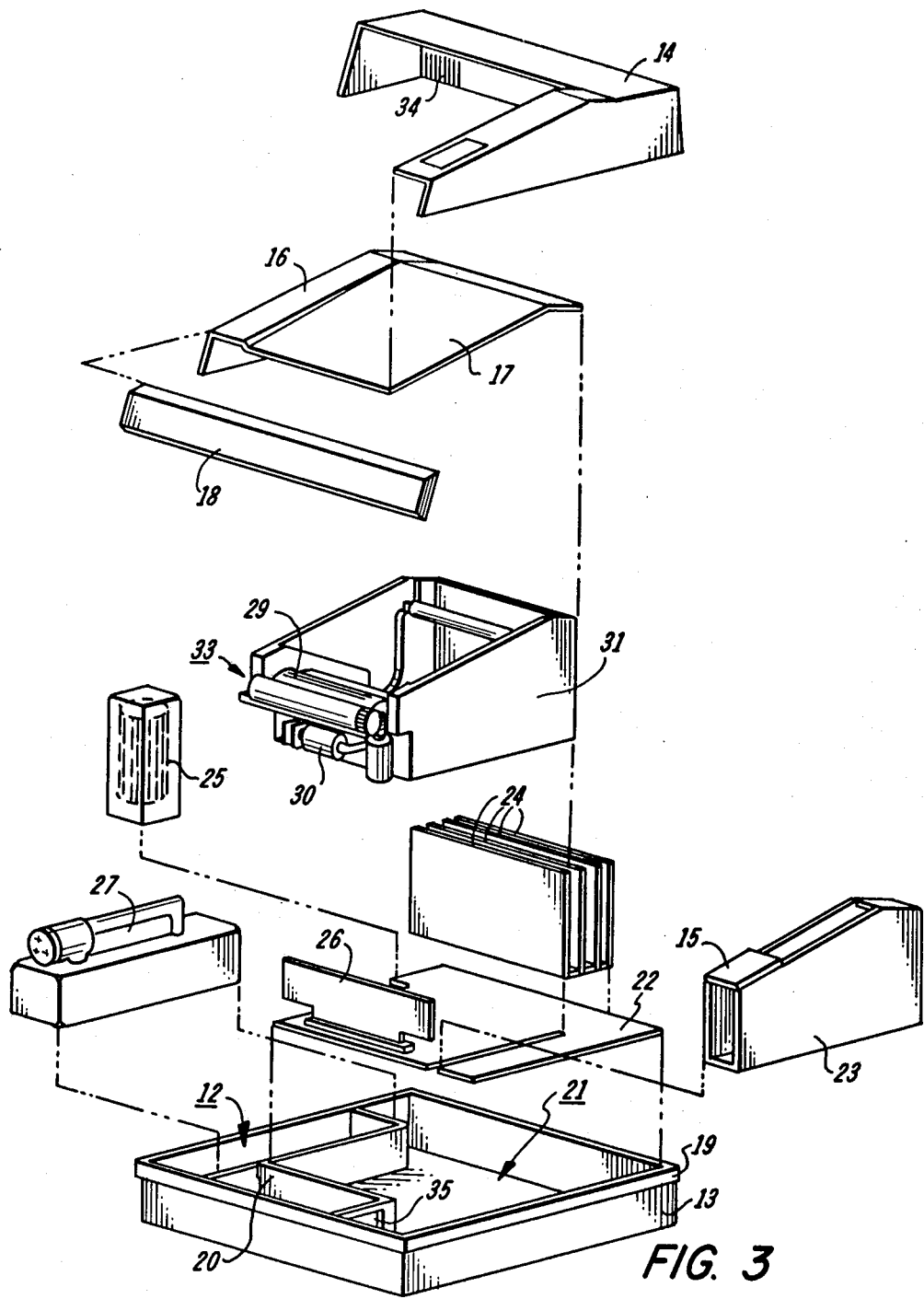
FIG. 3 is an exploded perspective view of the electrographic recorder showing the construction modularity.

Turning now to FIG. 3, the modularity and simplicity of design of the printer 10 should be clear. The base 13 is seen to be separated into two sections by an internal wall arrangement 20 which defines the L-shaped liquid developer moat 12 on one side and the electrical connector zone 21 on the other.

Within the zone 21, on the floor of base 13, there is positioned a power distribution card 22 in the form of a printed wiring board. Card 22 provides the total electrical interconnect between the various electrical components plugged into it. Thus, conventional wiring, which is labor intensive and therefore is a costly manufacturing function is virtually eliminated in this machine. Seated upon and in suitable electro-mechanical contact with the power distribution card 22 are the power supply elements, housed in cage 23, machine logic boards 24, cooling blower 25 and writing head 26. Power supply cage 23 also supports control panel 15.

Figure 4:
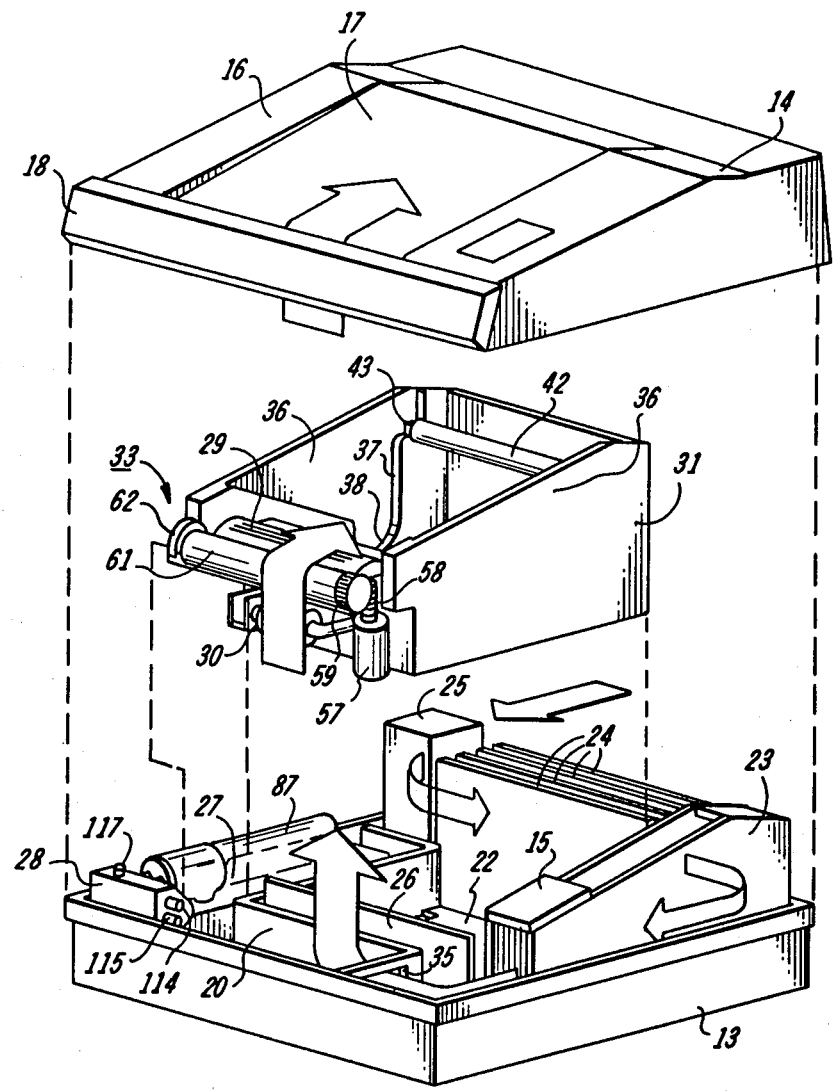
FIG. 4 is partially exploded view showing the liquid retaining and air flow zones within the electrographic recorder.

Within the liquid developer moat 12 on the side leg thereof, is the liquid developer bottle 27. Communicating with the bottle 27 is the developer access manifold 28 (FIG. 4) which delivers developer to the toning fountain 29 via pump 30, in a manner to be discussed more fully subsequently. As thus arranged, all machine elements carrying liquid developer, viz. bottle 12, manifold 28, toning fountain 29, pump 30 and suitable conduits, are located within the developer moat 12. All liquid is thereby prevented from entering the electrical connector zone 21, in which the power distribution card 22 lies at the bottom of base 13. The catastrophic result of spurious liquid within zone 21 is self explanatory.

In the central area, defined by the developer moat 12 on two sides and by the power supply cage 23 and logic boards 24 on the remaining two sides, there is positioned a support chassis 31. The chassis may be secured in place by several screws which pass through the power distribution card 22 and are seated in the base 13 for holding those elements in position, and rigidifying the base. In addition to supporting a roll 32 of paper (see FIG. 2) or fan-fold supplied paper (not shown) the chassis 31 supports an integrated writing, toning and driving assembly 33, whose functions and construction are to be described.

Another unique feature of this highly efficient recording machine becomes apparent by virtue of this arrangement. Cooling and drying air flow is peripherally directed in a plenum zone by the advantageous central positioning of the chassis 31. Ambient air is allowed to enter the machine through a grille 34 formed in the cover 14 adjacent blower 25 as indicated by an arrow in FIG. 4. The blower propels cooling air over and between logic boards 24 and into and through power supply cage 23. The air becomes heated thereby. The thus heated air is then directed through window 35 in wall 20, and is passed upwardly over the developed image on the paper, to aid in the final drying of the paper as it exits the machine and moves over platen 17.

Figure 5:
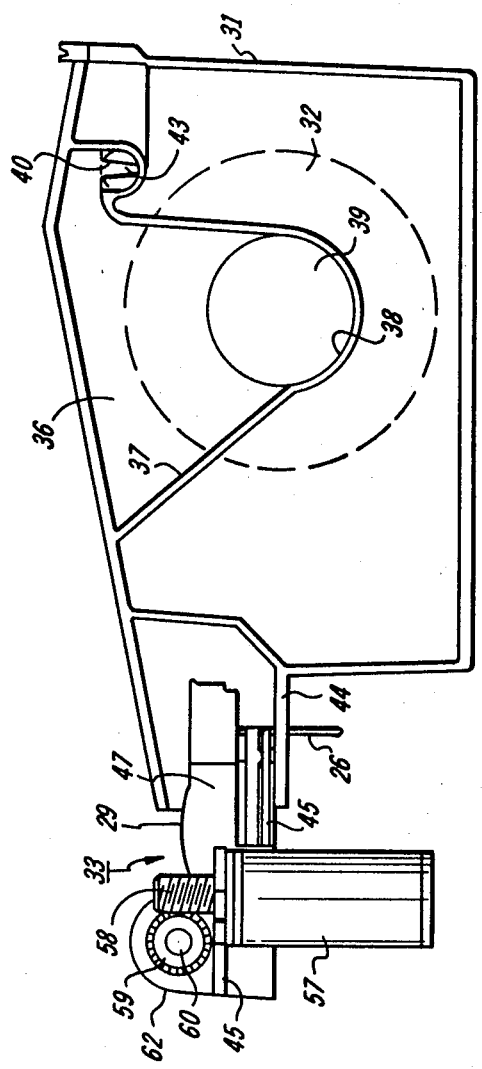
FIG. 5 is a right side view showing the support chassis and the integrated writing, developing and driving subassembly mounted thereon.
Figure 6:
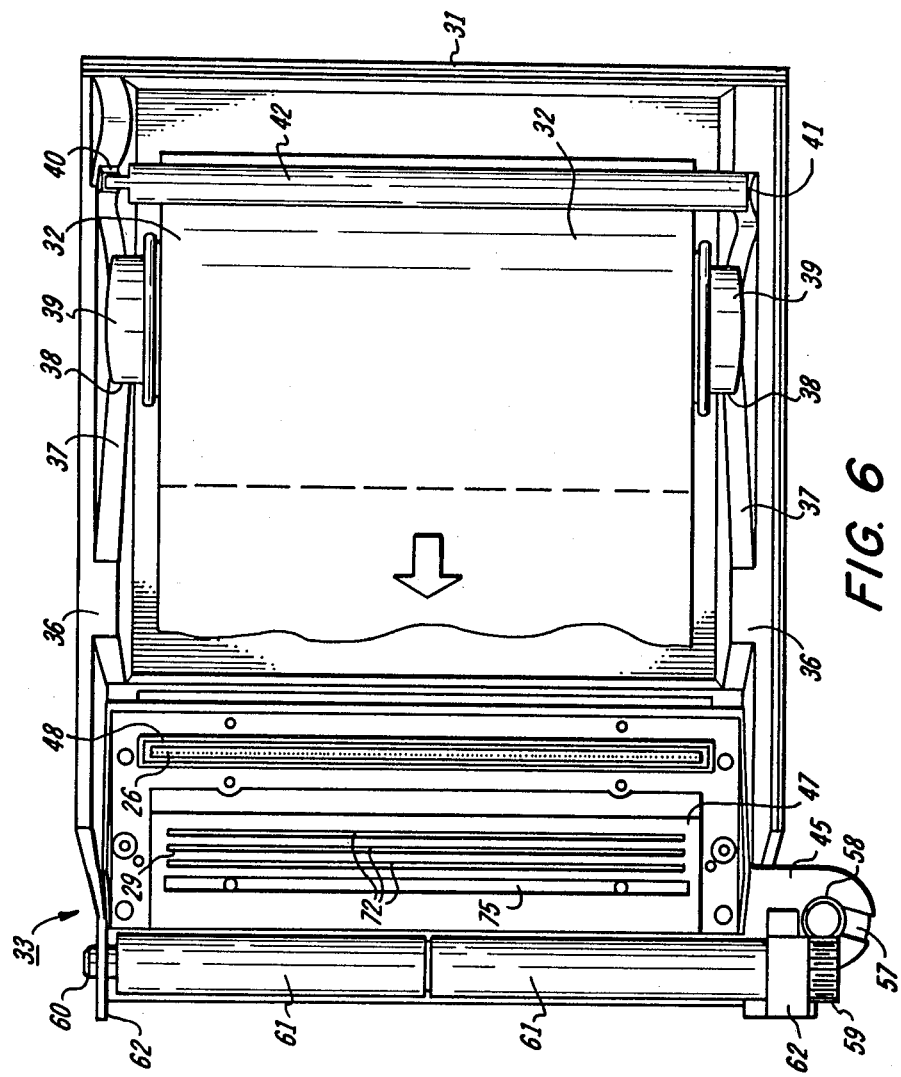
FIG. 6 is a top view of the elements shown in FIG. 5.
Figure 7:
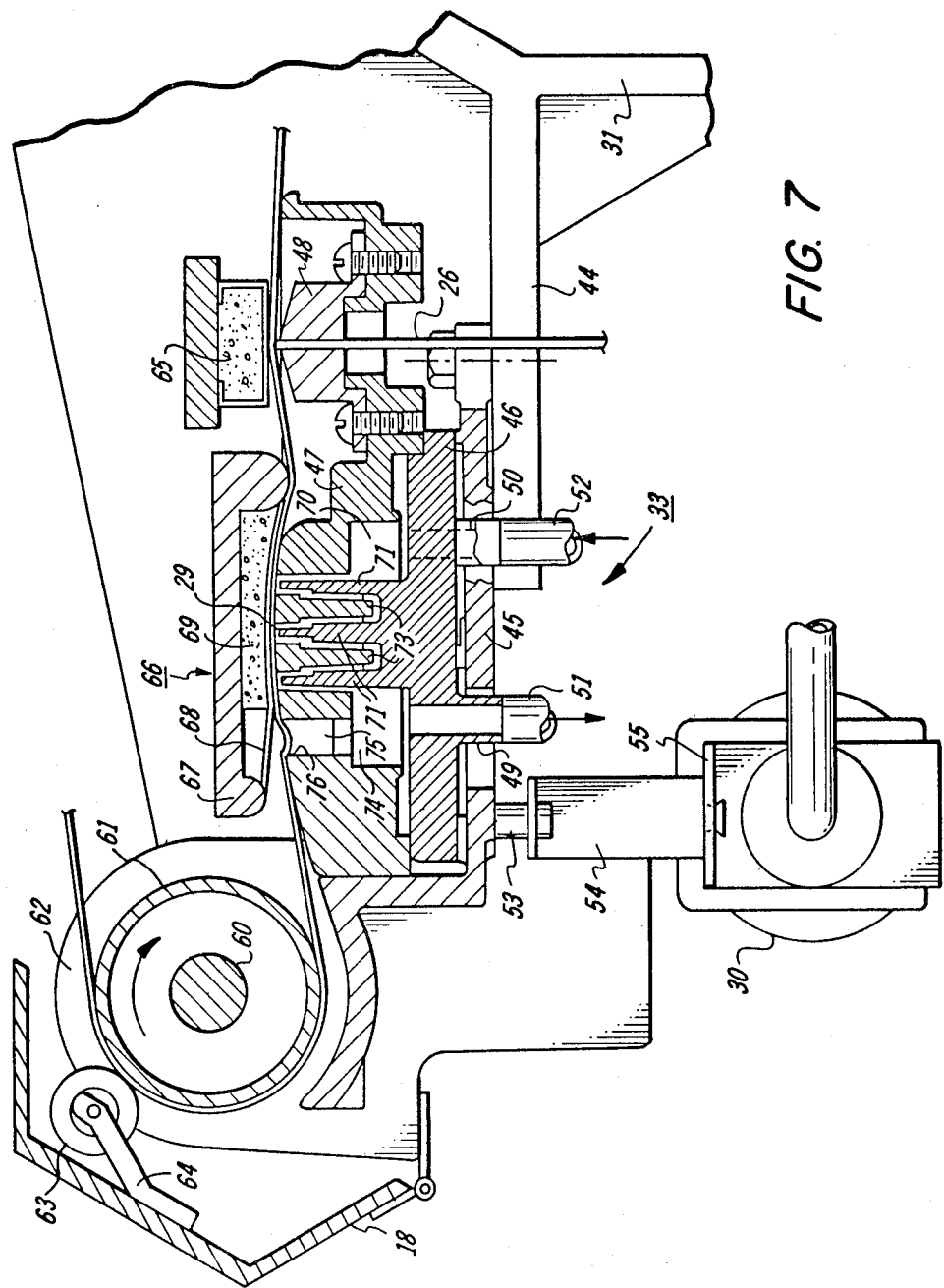
FIG. 7 is a sectional view taken through the integrated writing, developing and driving sub-assembly.
Figure 8:
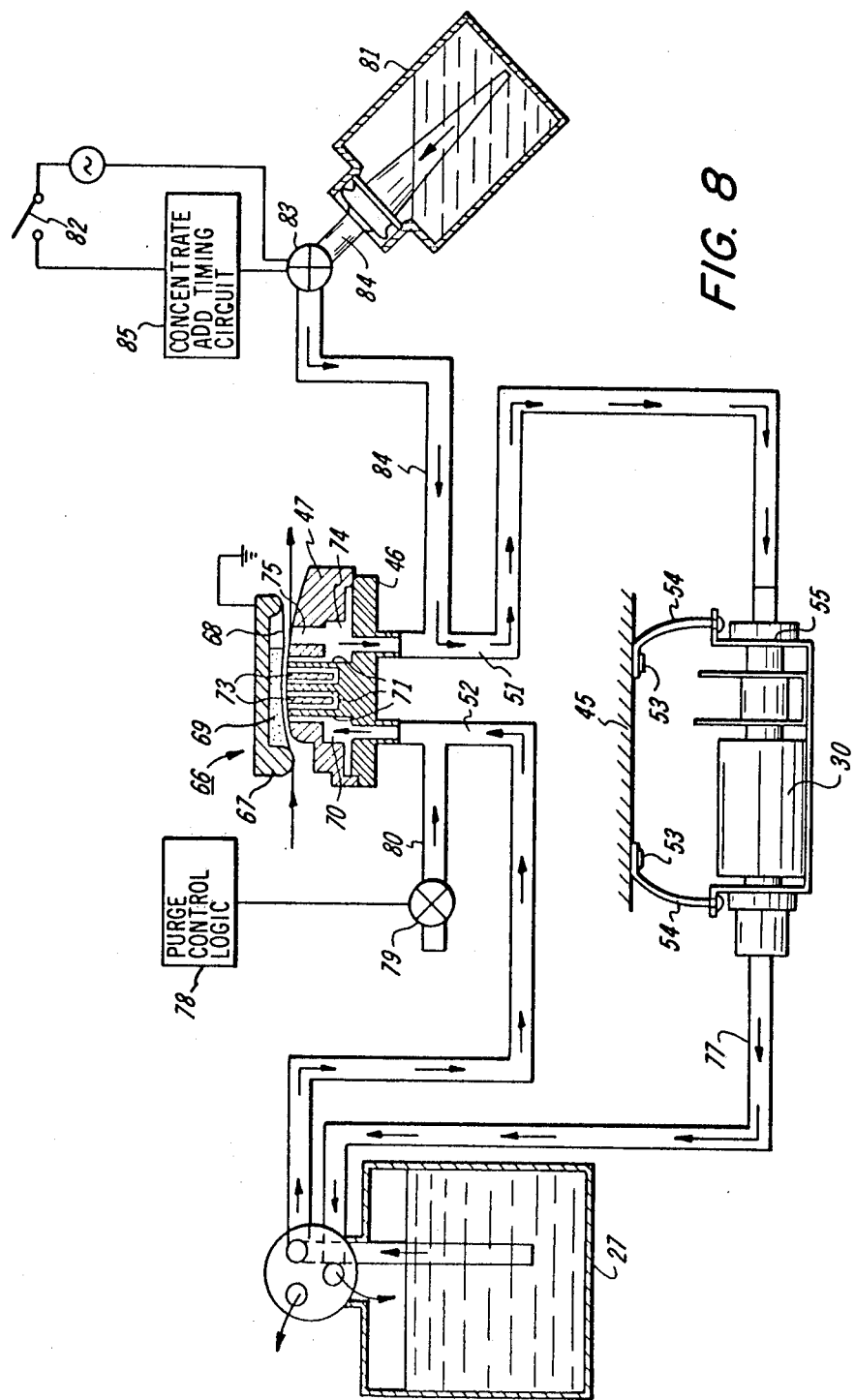
FIG. 8 is a schematic view showing the liquid developer flow system.

With particular reference to FIGS. 5, 6 and 7 the paper chassis 31 and the writing, toning and driving assembly 33 will be more specifically described. Chassis 31 is a one piece molded plastic container in which the supply of paper suitable for electrostatic recording is stored for ease of delivery to the downstream processing station. Integrally molded in opposed side walls 36 of the chassis, are paper support ramps 37 defining arcuate seats 38 capable of receiving paper roll hubs 39. Ramps 37 also include opposed supports 40 and 41 for receiving the ends of fan fold support bar 42. Support 40 comprises a keyway to retain key portion 43 of support bar 42 against rotation, while support 41 may be arcuate for receiving the opposite cylindrical end of bar 42.

When roll stock is to be inserted into chassis 31 hubs 39 are introduced into the conventional cylindrical core upon which the paper is wrapped by the manufacturer. Since it is desired to provide a moderate drag force on the paper to prevent free rolling of the supply roll once the driving force is stopped, the hubs 39 are made of a suitable material to generate the desired degree of friction when in sliding contact with arcuate seats 38.

If it is desired to feed fan fold material, the flat stack of interconnected sheets is placed on the bottom of chassis 31 and the leading sheet is trained over support bar 42 and then directed to the downstream processing station. A suitable drag is imposed on the sheet by means of a friction pad which may be spring loaded (not shown), carried by lid 16, and urged against the central portion of support bar 42 when the machine is operational.

At the forward end of chassis 31 there are formed seats 44 adjacent side walls 36 to which is secured a frame member 45 in the form of a precisely machined rigid casting which underlies and supports the writing, toning and driving assembly 33. Seated upon and accurately positioned on frame 45 is toning fountain 29 comprised of a fountain base 46 and a fountain top 47 intimately fitted together. The fountain top carries a writing head positioning block 48 through which the uppermost portion of the writing head passes and is accurately aligned thereby. Depending from the fountain base 46 and passing through suitable openings in frame 45 are hose fitting bosses 49 and 50 to which are connected discharge hose 51 and inlet hose 52, respectively. Downwardly protruding buttons 53 on frame 45 each accept the upper ends of rubber straps 54, the lower ends of the straps supporting hanger 55, on which is thus seated in vibrational isolation the suction pump 30. An inexpensive relatively low volume throughput bellows type pump is preferably used.

Frame 45 also supports the drive elements which include depending servomotor 57, to whose output is connected an upstanding worm 58. Coupled to the worm is worm gear 59, secured on the horizontal drive shaft 60 of differential drive roller 61. The shaft 60 is supported in upstanding endplates 62 of frame 45. The remaining portion of the drive arrangement is shown in FIG. 7. It comprises pinch rollers 63 (one shown), carried by front cover 18 on resilient spring supports 64 which urge the pinch rollers against drive roller 61 when the cover 18 is closed. The cover 18 is secured to frame 45 by hinges thereby insuring perfect alignment of the drive assembly.

Alignment of the writing head 26, toning fountain 29 and drive roller 61 relative to one another is critical. By securing all of these elements to the accurately machined and tapped frame 45 an independent subassembly (identified above as 33) is provided. By this arrangement, aligning, adjusting and testing of the subassembly may be accomplished at the sub-system level before it is installed in the main machine structure. Thus, once the subassembly 33 is satisfactorily put together on a factory workbench it may simply be secured to the chassis seats 44 by means of several mounting screws. The required labor for assembly, adjustment and testing is substantially minimized as compared to conventional assembly techniques heretofor used in this art.

Writing on the sheet (i.e. deposition of electrostatic charges in imagewise configuration) is accomplished by passing it between the writing head 26 and back-up electrode 65. The writing head comprises a longitudinal array of evenly spaced conductive nibs (not shown). The conductors are coupled to suitable voltage sources, through the power distribution card 22, for recording. Each of a series of backup electrodes (one shown) is electrically addressed to cooperate with selected nibs to generate discrete charges on the recording sheet. The backup electrodes are more fully described in co-pending application Ser. No. 911,584, filed June 1, 1978, entitled "Backup Electrode Arrangement for Electrostatic Recorder" in the names of William A. Lloyd and David D. Thornburg and assigned to the same assignee as the instant application.

The discrete electrostatically recorded portions on the recording sheet are made visible at the toning fountain 29. Liquid developer supplied in developer bottle 27 comprises a premix of about 99.5% of a high purity hydrocarbon solvent such as Isopar G (a trademark of Exxon Corp.) and about 5% carbon black treated with insoluble resinous materials. The liquid developer is drawn through the system by means of the suction pump 30.

As set forth above, it has been an object in the design of this entire machine to keep costs of manufacture and assembly to a minimum. To this end, suction pump 30 is relatively small, drawing fluid under the influence of a pressure of about 2 inches of mercury. However, the choice of a smaller pump necessitated a new approach to the toner fountain design since conventional fountains in use with this smaller pump, were inadequate due to the extremely low flow rate produced by the available suction. Air normally entering the system forms bubbles in the toner fountain which cannot be pushed off by slow moving liquid developer, and results in untoned areas on the recording sheet. A satisfactory faster liquid developer flow rate of 0.2 to 0.4 gallons per minute which is capable of driving away the air bubbles is achievable herein by passing the fluid in a unique three pass sinusoidal series flow through the fountain.

As the recording sheet passes over the smoothly curved upper surface of the fountain top 47 it is forced into intimate contact therewith over the desired wrap angle by pressure member 66 carried by lid 16. Member 66 comprises a rigid, electrically grounded, conductive channel 67, extending transversely to the direction of sheet movement, over which is trained a smooth conductive plastic sheet 68 of high density polyethylene, backed by a foam pad 69. It should be noted that the pad is not coextensive with the channel, in order to abruptly end the wrap angle.

As soon as the pump 30 is energized and begins to draw a suction, the recording sheet will be drawn downwardly into intimate contact with the fountain top 47 to close the system and start drawing liquid developer from the bottle 27 through inlet hose 52 and into the inlet chamber 70 of the fountain. Inlet chamber 70 extends completely transversely across the fountain, between the base 46 and the top 47 so as to allow the liquid developer to deposit the charged its toner particles, on the oppositely charged areas of the sheet, completely across the sheet from one side thereof, to the other. The fountain base 46 has integrally formed thereon transversely extending upstanding stepped baffles 71. Fountain top 47 is formed with slots 72 also extending transversely to the direction of paper movement, the slots being defined between depending T-shaped baffles 73. During assembly of the base and top, the ends of upstanding baffles 71 are intimately fit into openings provided therefor in the top, to insure that a fluid tight, unitary member is formed which will only allow fluid to flow in a sinuous path over the top edges of baffles 71 and under the bottom edges of baffles 73. To allow this flow, the top edges of baffles 71 are about 7 mils below the arc defined by the upper curved surface of the fountain top. The steps on baffles 71 and 73 cause an agitation and intermixing to occur throughout the liquid developer moving therepast, to insure that toner particles will come into contact with the sheet at the next downstream opening. In the absence of these steps there is a possibility of some toner depletion from one opening to the next. As the liquid developer passes out of the development zone, defined by the three slots 72, it empties into elongated outlet chamber 74 from which it passes into discharge outlet 49. Although it is not readily apparent from the drawings, the inlet and outlet openings 50 and 49 are located at opposite corners of the fountain casting so as to contribute to the cross-mixing action of the liquid developer in the development zone.

Communicating with the outlet chamber 74 is elongated cleanup opening 75 into which the sheet is slightly drawn by the suction (see FIG. 7). This deflection is important in order to allow the exiting edge 76 of the opening to serve as a knife edge for removing excess developer. The sheet, thus doctored, will be made substantially dry as it leaves the toning fountain 29. It should be noted that the resilient backing pad 69 of pressure member 66 terminates upstream of the cleanup slot 75 so as not to interfere with the passage of the sheet therepast, as by causing it to flatten. Furthermore, since the plastic sheet 68 does not contact the recording sheet in the cleanup zone ambient air will more readily be drawn through the sheet to assist in drawing the excess fluid to its lower surface for removal at the knife edge 76. The proper degree of bowing for effective cleanup, will be affected by paper tension and vacuum level.

From the outlet chamber 74 the developer is drawn into discharge hose 51 and then to the suction pump 30, through the pump, into return hose 77 and finally to liquid developer bottle 27 for reuse.

At the end of a printing run it is desired to remove all liquid developer in the toning fountain to prevent marks on the sheet. This is accomplished by purging the fountain with air. Purge control logic 78 identifies the end of a printing run and opens solenoid valve 79 to communicate inlet hose 52 to the atmosphere through purge hose 80.

As toning continues, the toner to solvent ratio diminishes, to the point where the printing begins to lighten. In order to replenish the toner in the liquid developer, a high toner-to-solvent concentrate is added from concentrate bottle 81 carried by lid 16. Manual concentrate add switch 82 may be depressed in order to open concentrate add solenoid valve 83, allowing the suction pump to pull concentrate out of the bottle through add hose 84 into discharge hose 51 and eventually to the liquid developer bottle 27 where it becomes thoroughly mixed. Typically, the concentrate bottle 81 will have an 8 ounce capacity which could be drawn dry in about 30 to 40 seconds at the fluid flow rate of the system. Therefore, a concentrate add timing circuit 85 is provided to limit the opening of solenoid valve 83 to 1 to 2 seconds for each manual closure of switch 82. An automatic alternative to the manual concentrate addition system may be utilized. In such an automatic system toner concentration is continually monitored. When the toner level becomes too low the solenoid valve 83 is opened for a predetermined length of time. An automatic system for this purpose is more fully described in copending patent application U.S. Ser. No. 669,205 filed on Mar. 22, 1976 entitled "System and Method for Monitoring and Maintaining a Predetermined Concentration of Material in a Fluid Carrier" in the names of William A. Lloyd, Herman Wong and Keith E. McFarland and assigned to the same assignee as the instant application.

Figure 9:
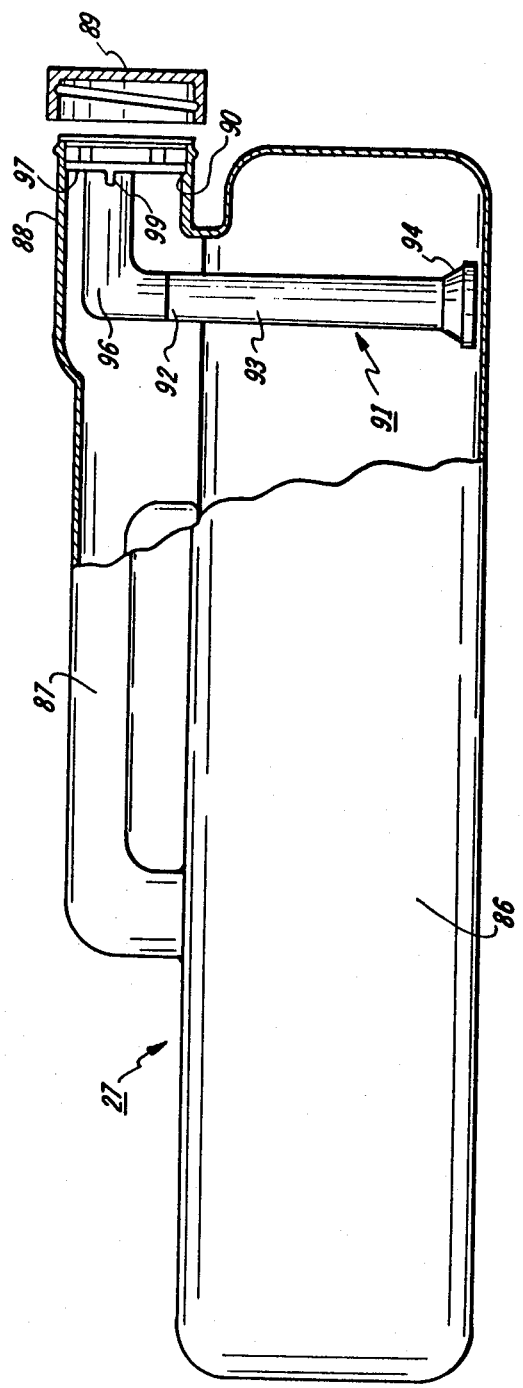
FIG. 9 is a side view of the liquid developer supply bottle partially broken away to show the suction tube assembly.
Figure 10:
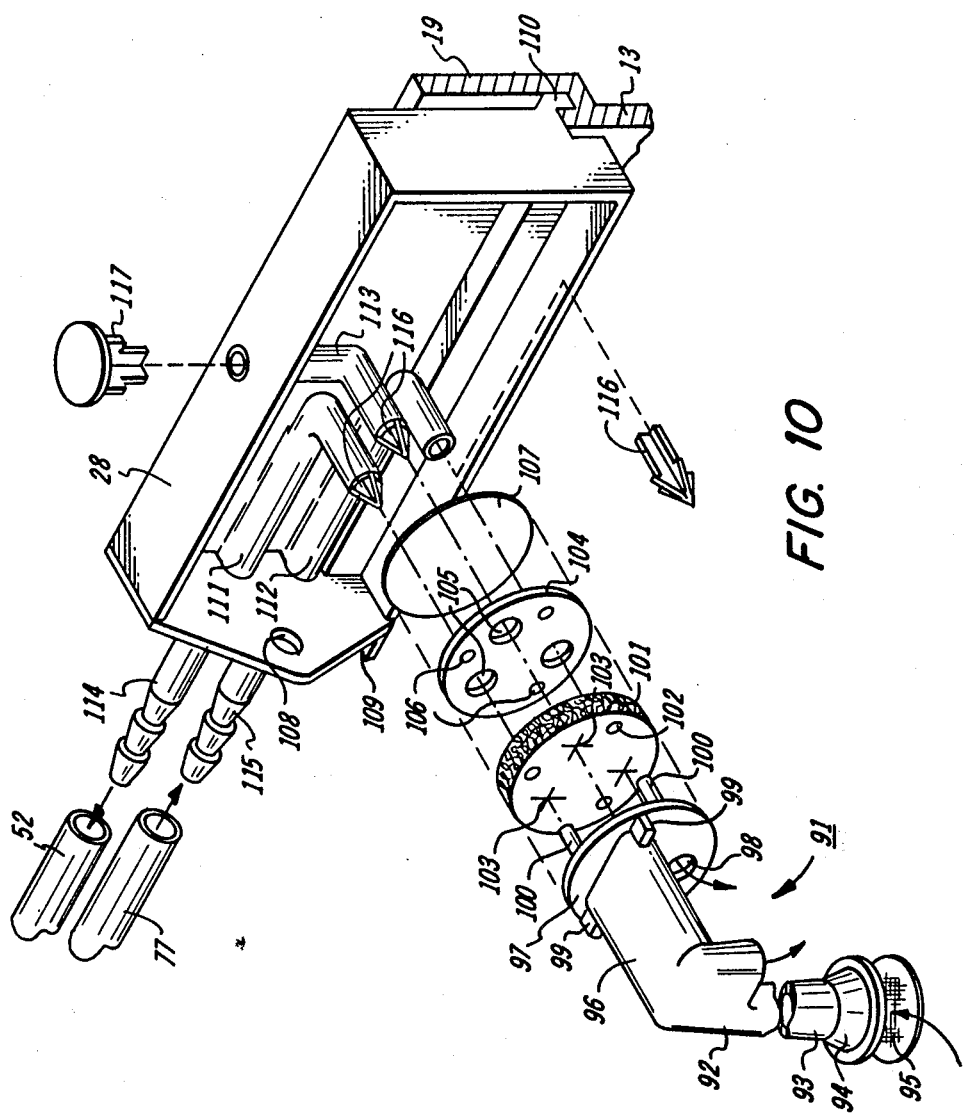
FIG. 10 is an exploded perspective view of the developer access manifold and the suction tube assembly with which it cooperates.

With reference to FIGS. 9 and 10 there is illustrated in greater detail, the liquid developer bottle 27, and its associated access manifold 28. Molded plastic developer bottle 27 has a long and narrow body 86 with an integral handle 87 and a forwardly extending neck 88. At the exterior of the neck, threads are formed to receive protective bottle cap 89 during delivery and storage. At the interior of the neck 88, a seat 90 is formed to receive suction tube assembly 91.

Suction tube and seal assembly 91 includes L-shaped tube 92 having a vertical leg 93 terminating in a flanged base 94 which may optionally accept a filter screen 95 to prevent delivery of agglommerated toner or other debris, such as paper particles, to the toning fountain. Upper end 96 of tube 92 is widened to provide an air vent opening therein in addition to the suction tube. An integral circular flange 97 on the upper end 96 is apertured for delivery and venting (not shown) and at 98 to form an opening for receiving returned liquid developer, Positioning lugs 99 are formed on one side of flange 97 while from the other side extend three positioning pins 100. Open cell plastic foam sealing disc 101 has holes 102 to receive pins 100 and is slit at 103 in a cross pattern a locations in alignment with the openings in the flange 97 of suction tube 92. The disc 101 is sandwiched between circular flange 97 and plastic cover disc 104 provided with piercer clearance holes 105 and positioning pin receiving holes 106. The three elements 92, 101 and 103 are permanently secured together to form suction tube assembly 91, as by sonic welding and are placed in the neck of developer bottle 27 being positioned by the lugs 99 received in suitable seats formed in the neck 88.

Once the disposable bottle 27 has been filled with liquid developer, the mouth is sealed by welding rupturable aluminum foil disc 107 both to the bottle and to cover disc 103. The bottle may then be capped for shipping and storage.

Liquid developer is drawn from and returned to bottle 27 through developer access manifold 28 which is securely mounted in the machine against movement in several directions by being fastened to one of the frame endplates 62 through hole 108, positioning locating lip 109 under the frame endplate, and overlapping lip 110 on the rim of base 13, as shown. Three conduits are formed in the manifold, a delivery conduit 111, a return conduit 112 and an air vent conduit 113. Suitable connector fittings 114 and 115 are formed on delivery and return conduits, respectively, to receive delivery hose 52 and return hose 77. The bottle connector ends of each of conduits 111, 112 and 113 accept arrow-head type piercing elements 116 and vent conduit 113 is capped at its opposite end with vent cap 117. Each of the piercing elements 116 and the vent cap 117 are of cruciform cross section to allow air flow therethrough and are provided with shoulders to limit entry into their respective conduits.

Handling of the disposable liquid developer bottle 27 by the user is a simple and clean task. Prior to introducing the bottle into the machine, the bottle cap 89 is removed and discarded. The bottle is then taken by handle 87, seated on the base 13 within moat 12 and drawn forward against developer access manifold 28. The handle has been located on the bottle to more easily accomplish its several intended functions. It is substantially centrally located over the body of the bottle to serve as a carrying handle, and it is substantially longitudinally aligned with the sealed bottle neck 88 for efficient transmittal of the force needed to pierce the seal.

Forward movement of the bottle causes piercing elements 116 in conduits 111, 112 and 113 to puncture aluminum foil sealing disc 107, pass through aligned clearance holes 105 in cover disc 104, then pass through foam disc 101 in alignment with cross slits 103 and finally enter the delivery, return and venting openings in flange 97 of suction tube 92. The foam sealing disc 101 tightly encircles the conduits 111, 112 and 113 to provide an air tight suction path for withdrawing developer from the suitably vented bottle. Furthermore, when the bottle is empty and the user draws it back with handle 87 to remove it, for replacement with another, the foam sealing disc 101 will seal up the bottle, preventing residual liquid developer therein from spilling out.

In view of the forces applied to the bottle during introduction and removal it can now be appreciated that the mounting arrangement for the developer access manifold 28 allows that element to be securely positioned within the machine to withstand those forces with but a single screw. This is a further example of the simplicity of machine design utilized herein to lower manufacturing and assembly costs.

Figure 11:
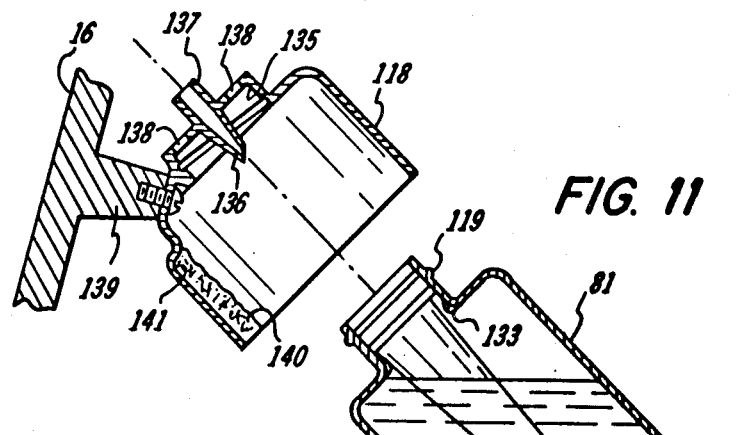
FIG. 11 is a side view, partially in section, showing the concentrate access manifold and concentrate bottle.
Figure 12:
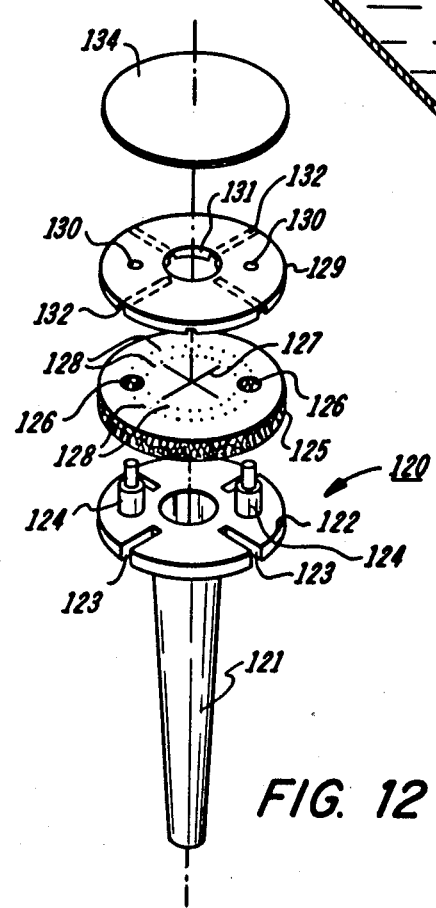
FIG. 12 is an exploded perspective view of the concentrate suction tube assembly.

Turning to FIGS. 11 and 12 there is illustrated in detail the toner concentrate bottle 81 and its associated access manifold 118. The bottle is formed with a threaded neck 119 which accepts a conventional screw cap (not shown). During storage and delivery the cap protects the sealing elements.

Suction tube sealing and vent assembly 120 includes a tapered tubular stem 121 bearing a circular flange 122 at its upper end. The flange is radially slotted at 123 and carries positioning pins 124. An open cell plastic foam sealing disc 125 having positioning holes 126 bored therethrough, is centrally cross cut at 127, and has been punctured by a series of holes 128 arranged in two concentric circles to provide a number of small aligned passages through the foam. A plastic cover disc 129 is formed with positioning holes 130, a larger central opening 131 and radial grooves 132 on its lower surface facing the foam disc. These three elements are secured together as by sonic welding the ends of positioning pins 124 to cover disc 129 after sandwiching the foam disc 125 therebetween. The composite member, thus formed, is placed into the neck 119 of concentrate bottle 81 against the restraining shoulder 133 at the base of the neck, after the bottle has been filled with toner concentrate. Finally, the bottle is sealed by aluminum foil disc 134 welded to its open end.

Concentrate access manifold 118 comprises a cup-shaped casting with a threaded ring 135, for receiving the threaded end of concentrate bottle 81, and a sharp, tapered, tubular, piercing fang 136 extending inwardly along the central axis of the threaded ring. Extending outwardly along the central axis is concentrate delivery fitting 137 to which is attached the concentrate add hose 84. Breathing holes 138 in the end wall surround the fang/fitting element. The manifold is secured in place in the machine to suitable mounting bosses 139 (not shown) depending from lid 16, as by being screwed thereon. When the lid is open, for access to the machine interior, it and the concentrate bottle are substantially in the position shown. As thus arranged, during introduction and removal of the concentrate bottle 81 from the manifold, the manifold is maintained with the piercing fang above a drip collecting foam pad 140, housed in seat 141 in the manifold side wall.

Access to the liquid concentrate is much the same as access to the liquid developer, namely, fang 136 pierces and rends aluminum foil seal 134, passes through cover disc 129 and cross-cut 127 in foam seal 125 and into the suction tube stem 121. The foam provides an air tight suction path for the liquid concentrate. Upon removal of the bottle from the manifold the foam will seal up the bottle. As described above, any liquid remaining in the fang will drip onto foam pad 140.

As liquid concentrate is withdrawn from the bottle 81, air must replace the removed contents in order to allow suction removal to continue. It is sufficient for air to enter the bottle 81 slowly since concentrate removal is intermittent and in small quantities. To this end, the air flow path designed into the sealing elements is as follows. Air enters breathing holes 138, passes around the centrally torn aluminum foil 134, through the central opening 131 in cover disc 129, radially outwardly along grooves 132 over the upper surface of foam disc 125 which has been pierced at 128. Air slowly finds its way through the open-cell foam to the opposite surface of the disc 125 and passes into the bottle through radial slots 123. This path will not allow concentrate to flow through even if the bottle is tipped upside down.

A sealing and suction access arrangement has been described for both the liquid developer and the concentrate which ensures that these relatively soiling material may be handled efficiently and cleanly by the casual user of the machine. Both disposable bottles 27 and 81 may be introduced into the machine in a foolproof manner with a minimum of effort and skill and, perhaps more importantly, their removal will not cause spillage.

It should be understood that the present disclosure has been made only by way of example and that numerous changes in details of construction and the combination and arrangement of parts may be resorted to without departing from the true spirit and the scope of the invention and hereinafter claimed.

What is claimed is:

1. An electrographic recorder of modular construction including a trough-like rectangular base for receiving machine components and a cover overlying said base to define an enclosure therewith, said recorder being characterized by
a plurality of zones within said enclosure including
a liquid developer zone within which are disposed all liquid containing elements, and
an air plenum zone through which air is driven, and
a rectangular support chassis having walls extending upwardly towards said cover, said chassis being substantially centrally located on said base, and wherein said liquid developer zone and said air plenum zone cumulatively surround the four sides thereof.

2. The electrographic recorder defined in claim 1 wherein said liquid developer zone is defined by upstanding interior walls in said base.

3. The electrographic recorder defined in claim 2 wherein one of said interior walls has an opening therein to allow air to flow therethrough into a portion of said liquid developer zone for aiding in drying the developed image on a recording sheet.

4. The electrographic recorder defined in claim 2 wherein said interior walls define an L-shaped liquid developer zone and said support chassis is disposed adjacent two of said interior walls.

5. The electrographic recorder defined in claim 1 wherein said machine components include electrical elements located in said air plenum zone.

6. The electrographic recorder defined in claim 5 wherein one of said electrical elements is a blower for driving air through said air plenum zone to cool those of said electrical elements which are heat generators.

7. The electrographic recorder defined in claim 6 wherein said blower is located adjacent one corner of said base and an opening is provided in said enclosure proximate said blower for allowing air to enter said enclosure.

8. The electrographic recorder defined in claim 5 further comprising a power distribution card partially disposed by beneath said support chassis and partially within said air plenum zone, to which said electrical elements are electromechanically connected.

9. The electrographic recorder defined in claim 8 wherein one of said electrical elements is a writing head and another of said electrical elements is power supply means.

10. The electrographic recorder defined in claim 1 wherein said support chassis includes means for supporting recording paper.

11. The electrographic recorder defined in claim 10 wherein said means for supporting includes seats provided on the side walls of said support chassis for receiving hubs of a paper roll.

12. The electrographic recorder defined in claim 10 wherein said means for supporting includes seats provided on the side walls of said support chassis and guide means for fan-fold paper received in said seats.

13. The electrographic recorder defined in claim 1 wherein record material drive means is mounted upon said support chassis, said drive means including drive motor located within said air plenum zone.

14. The electrographic recorder defined in claim 1 wherein a liquid developer fountain is mounted upon said support chassis within said liquid developer zone.

15. The electrographic recorder defined in claim 14 wherein a liquid developer supply container is positioned within said liquid developer zone.

16. The electrographic recorder defined in claim 15 wherein a liquid developer concentrate container is positioned within said liquid developer zone.

17. The electrographic recorder defined in claim 15 wherein liquid developer supply and return conduits are connected between said supply container and said fountain, and pump means is located between said supply container and said fountain in one of said conduits, said conduits and said pump means being positioned within said liquid developer zone.

18. An electrographic recorder including a trough-like base for receiving machine components, a cover overlying said base to define an enclosure therewith, plural electrical components and a liquid developer marking system housed in said enclosure, said recorder being characterized by a support chassis substantially centrally disposed within said base, defining a peripheral area therearound, a moat, within said base, comprising a portion of said peripheral area within which is disposed all liquid developer storage and usage components of said marking system, an air flow zone, comprising the remaining portion of said peripheral area, for cooling said electrical components, and a power distribution card, partially disposed beneath said support chassis and partially within said air flow zone, to which said electrical components are electromechanically connected.

* * * * *